United States Patent [19]

Kopf

[11] Patent Number: 5,402,332
[45] Date of Patent: Mar. 28, 1995

[54] METHOD FOR OPTIMIZING THE EFFICIENCY OF A SET OF MACHINES COMPRISING A TURBINE AND A GENERATOR

[75] Inventor: Eberhard Kopf, Heidenheim, Germany

[73] Assignee: J.M. Voith GmbH, Heidenheim, Germany

[21] Appl. No.: 80,334

[22] Filed: Jun. 22, 1993

[30] Foreign Application Priority Data

Jun. 23, 1992 [DE] Germany .................. 42 20 255.8

[51] Int. Cl.$^6$ .............................................. G05B 13/04
[52] U.S. Cl. .................................. 364/149; 364/150; 364/151; 364/494; 364/495
[58] Field of Search ............ 364/148, 149, 150, 151, 364/494, 495, 510, 511

[56] References Cited

U.S. PATENT DOCUMENTS

| | | | |
|---|---|---|---|
| 4,234,925 | 11/1980 | Kitano | 364/494 |
| 4,319,320 | 3/1982 | Sato et al. | 364/165 |
| 4,486,381 | 12/1984 | Koji et al. | 376/210 |
| 4,770,843 | 9/1988 | Taleyarkhan | 364/149 |

Primary Examiner—Paul Gordon
Attorney, Agent, or Firm—Baker & Daniels

[57] ABSTRACT

A method for optimizing the efficiency of a set of machines comprising a double-controlled turbine and a generator. A correlation is determined between the efficiency $\beta$, flow Q, variable height of fall H, gate opening $\Delta\gamma$ and runner opening $\phi$ on a model set of machines by test series. The determination yields a model optimum curve for the respective height of fall, the model optimum curve having the optimum gate opening as a function of flow and runner opening. An optimum efficiency for an operating point of a large-scale system is determined by, based on the model optimum curve, making variations of the gate opening $\Delta\gamma$ and of the runner opening $\phi$ on the large-scale system, the variations being such that the flow of the model set of machines would remain constant for the same variations, and wherein the flow of the large-scale system is also presumed to be constant. The power outputs before and after the variations are compared to determine stepwise the $\Delta\gamma/\phi$ operating point with optimum efficiency.

9 Claims, 6 Drawing Sheets

METHOD FOR OPTIMIZING THE EFFICIENCY OF A SET OF MACHINES COMPRISING A TURBINE AND A GENERATOR

BACKGROUND OF THE INVENTION

The invention concerns a method for optimizing the efficiency of a set of machines comprising a turbine and a generator, wherein the method involves determining a correlation between the efficiency, flow, variable height of fall, the gate opening $\Delta\gamma$ and runner opening $\phi$ on a model set of machines by test series, which determination yields a model optimum curve for the respective height of fall, the model optimum curve having the optimum gate opening as a function of flow and runner opening, and wherein the optimum efficiency for an operating point of a large-scale system can then be determined. A so-called double-controlled turbine is concerned here. This means that the efficiency is optimized by adjusting the gate opening $\Delta\gamma$ and at the same time the runner opening $\phi$.

The efficiency, as generally known, derives from the ratio between the electrical output delivered by the generator to the hydraulic power input. The electrical power delivered at the generator terminals can be measured in a relatively simple fashion. On the other hand, especially with large-scale systems, determining the hydraulic energy input is very expensive, since to that end the flow needs to be measured in some way. This process has been known for a long time and has been described, e.g., in the trade magazine "Die Wasserwirtschaft," vol 1954, No. 4, pp 104–105, in the article "Simplified Process for Adjusting Kaplan Turbines to Best Efficiency."

In practice, the optimum efficiency curve is determined on a model set of machines, which in the case of large-scale turbines is built prior to constructing the large-scale system. For that purpose, an optimum efficiency curve for various heights of fall is prepared first for the model set of machines. The procedure is as follows. The runner opening $\phi$ is kept constant at one and the same height of fall while the gate opening $\Delta\gamma$ is varied. Obtained thereby is a number of steeply rising individual curves of constant runner opening $\phi$. The efficiency is determined simultaneously. The result is a statement expressing for which gate opening $\Delta\gamma$, at a specific runner opening $\phi$, the efficiency reaches a maximum value. The result is the so-called optimum $\Delta\gamma/\phi$ correlation in the form of a group of curves of optimum gate opening over the runner opening with the height of fall as a parameter which in the turbine controller represents the basis for adjustment of the turbine openings.

In practice, however, a deviation is encountered between the performance of the model set of machines and that of the large-scale system. For this reason, it is necessary to effect an adaptation on the large-scale system. Thus, while basing on the curves of the model set of machines, an optimization is carried out for the large-scale system with the aid of so-called index measurements. This optimization is unwieldy, time-consuming and expensive, since it inevitably requires a flow measurement.

The problem underlying the invention is to fashion the optimization of the curves of the optimum $\Delta\gamma/\phi$ correlation obtained on the model set of machines such that it can be performed in a faster, simpler and less expensive manner than before.

SUMMARY OF THE INVENTION

This problem is solved by the features of the present invention. Using the model optimum curve as a base, variations are made of the gate opening $\Delta\gamma$ and of the runner opening $\phi$ on the large-scale system. These variations are such that the flow of the model set of machines would remain constant for the same variations, and it is also presumed that the flow of the large-scale system is constant. The $\Delta\gamma/\phi$ operating point with optimum efficiency is found stepwise by comparison of the power outputs before and after the variations.

BRIEF DESCRIPTION OF THE DRAWINGS

The invention will be more fully explained with the aid of the drawings.

DESCRIPTION OF THE PREFERRED EMBODIMENT

Figure 1:
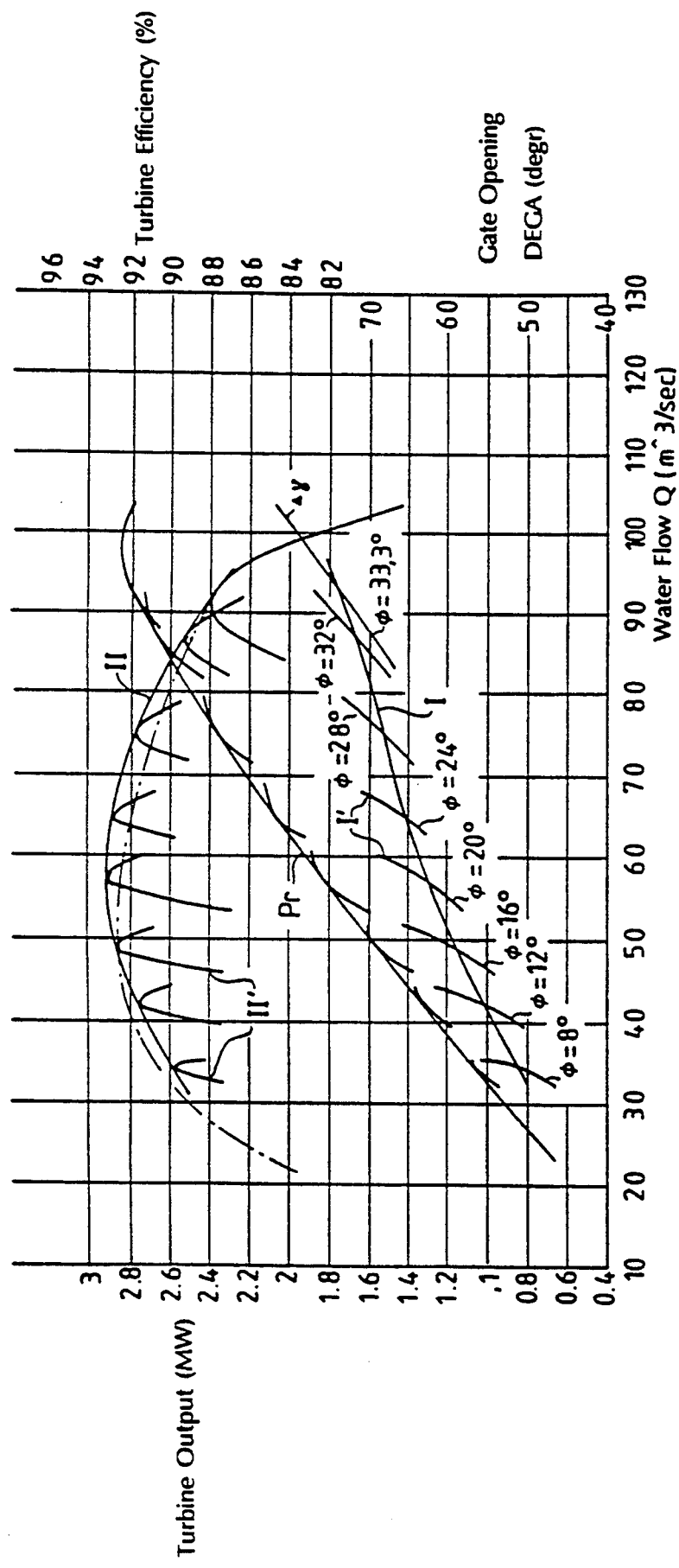
FIG. 1 shows curve I, which shows the progression of the optimum gate opening $\Delta\gamma$ over the flow Q, curves I', which are curves at constant runner opening $\phi$ for different gate openings $\Delta\gamma$, propeller curves II', which show the efficiencies of curves I', and curve II, which represents the progression of the optimum efficiency.

The invention provides a module for self-optimization of the $\Delta\gamma/\phi$ correlation. This module ensures that the turbine delivers at any operating condition the maximum possible output at optimum efficiency.

The module is founded on the basic idea of varying the gate and runner openings until a maximum output, and thus a maximum efficiency, is found. In the process, the gate opening and the runner opening are changed in such a way that during the search movement the flow, and thus the hydraulic power input, will practically not change. Parameters derived from the characteristic curves of the turbine are reverted to for that purpose, which parameters primarily depend on the blade geometry and therefore do not, or not substantially, differ from one another between the model set of machines and the large-scale system.

That is, a function f of gate opening $\Delta\gamma$ to runner opening $\phi$ can at a given height of fall H be found on the model set of machines, in a way such that the flow Q remains constant and that, thus, $\Delta\gamma=f(\phi)$ is returned, with H=constant and Q=constant.

This function f being essentially determined by the blade geometry of the turbine, it needs to be transferred with extreme precision from the model set of machines to the large-scale system. Notoriously, this conclusion does not apply to the transfer of the optimum efficiency curve from the model set of machines to the large-scale system.

This opens the possibility of varying the runner opening $\phi$ and gate opening $\Delta\gamma$ at a given height of fall H in a coordinated fashion by the function $\Delta\gamma=f(\phi)$ in such a way that the flow Q remains constant. Thus, the power input to the turbine also remains constant.

If this adjustment of $\Delta\gamma$ and $\phi$ causes a change in the power output on the generator, which allows easy and accurate measurement, this also corresponds to an efficiency change of the turbine of the same mathematical sign. Thus, a stepwise approach to the optimum efficiency of the large-scale system is thereby possible without any need for measuring the flow Q on the large-scale system.

In practicing the invention, one will use the optimum curve determined on the model set of machines, namely the curve of optimum gate opening $\Delta\gamma$ over the flow numbered as the runner opening $\phi$. Starting at a first point, a specific distance is traced on the curve, while changing the runner angle $\phi$, up to a second point. The curve of optimum gate opening $\Delta\gamma$ is then left, but the runner opening $\phi$ given at that second point is still retained until a third point is reached where the flow again has the same value as the flow at the first point.

The second point serves only as a computational aid to facilitate the calculation of point 3. The operating point of the set of machines is changed directly from point 1 to point 3. Next, a comparison is made as to whether the electrical output has been increased by variation of the turbine openings. If yes, the variation of the runner opening is increased in the same direction, and a new operating point is determined in the manner described above. If no, the variation of the runner opening is reduced correspondingly. The combination of gate opening and runner opening which is optimal for the respective flow and respective height of fall can thus be found after a relatively small number of search points.

This eliminates the cumbersome, expensive, and not always accurate flow measurement. All of the necessary measuring devices are already available, so therefore no additional provisions need to be made. The electrical output is given as well. Therefore, the inventional solution is extremely low-cost.

A particular advantage of the procedure described above consists of the fact that even greater shifts of the curves gate opening $\Delta\gamma$ over the flow Q at a constant runner opening $\phi$ have no effect whatsoever on the function of the search system. A prerequisite is merely that the rises of these curves be known exactly.

The optimization module, among others, allows for the following reflections:

The $\Delta\gamma/\phi$ correction must not occur too frequently and must not work either with overly large deflections, in order to (a) keep the system running smoothly, and (b) avoid early wear of the controls.

Several provisions have been made for that purpose. The search system is not permanently active. As soon as the optimum has been found for an operating point, the system remains at rest until the set of machines is within a new operating point.

It is sufficient for a correction of the preset $\Delta\gamma/\phi$ correlation to plot a relatively coarse raster of operating points between which interpolations can be made.

The time at which sufficient data are available can be determined by the user itself. Missing measuring points are inserted by interpolation.

The necessary jumps in the $\Delta\gamma/\phi$ movements can be kept so small that they are hardly recognizable in the normal operation of the system. Otherwise, nothing changes anyway on the inflow or outflow of the system, due to the flow-neutral search movement.

Provided as an option is the recognition by the system whether an operating point was already optimized. That is, the stored correction values are automatically set, and a repeat search operation is omitted. The search operation resulting in finding and correcting the necessary operating points is called the optimizing phase.

A further optimizing phase can be initiated both manually and automatically. In the automatic mode, the intervals at which the individual optimizing phases are initiated (for instance one year) can be programmed.

Additionally, the optimizing module allows an examination of specifically selected operating points, on optimization, in that the turbine is brought to a specific operating point and the module performs the corrective storage by a "single shot."

The long-duration inclusion of the change in outfit performance predestines the optimizing module also as a system for use with diagnostic functions. The generator can be used in various styles, for instance as a synchronous generator.

In finding the optimum $\Delta\gamma/\phi$ correlation in the model test, no allowance is made for the efficiency of the generator. While this, as such, represents an error, that error is negligible.

On the other hand, if the aforementioned search procedure according to the invention is carried out, the efficiency of the generator is taken into account.

Referring now to the drawings, FIG. 1 shows primarily two curves. Curve I shows the progression of the optimum gate opening $\Delta\gamma$ over the flow Q. As can be seen, curve I is intersected by curve I'. These curves are curves at constant runner opening $\phi$ for different gate openings $\Delta\gamma$.

For these curves I', the efficiencies are determined. Created thereby are so-called propeller curves II'. The maximum values of these propeller curves are situated on curve II, which represents the progression of the optimum efficiency. An optimum combination of runner opening and gate opening pertains to the maximum values of the efficiency.

Figure 2:
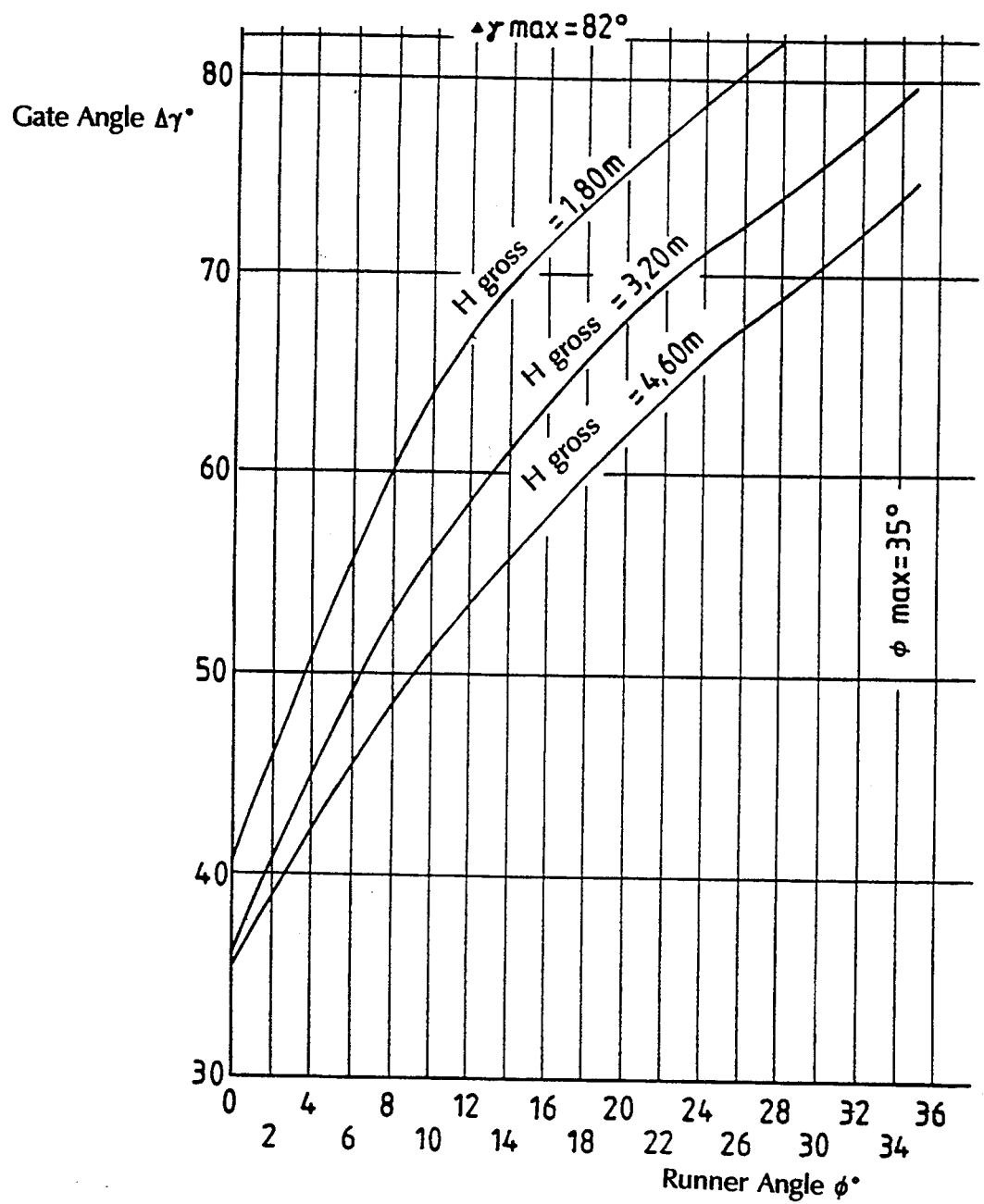
FIG. 2 shows a group of three curves as the result of the measurements illustrated in FIG. 1.

FIG. 2 shows a group of three curves as the result of the measurements illustrated in FIG. 1. These three curves show an optimum combination of gate angle $\Delta\gamma$ over the runner angle $\phi$, each for a specific height of fall.

Figure 3:
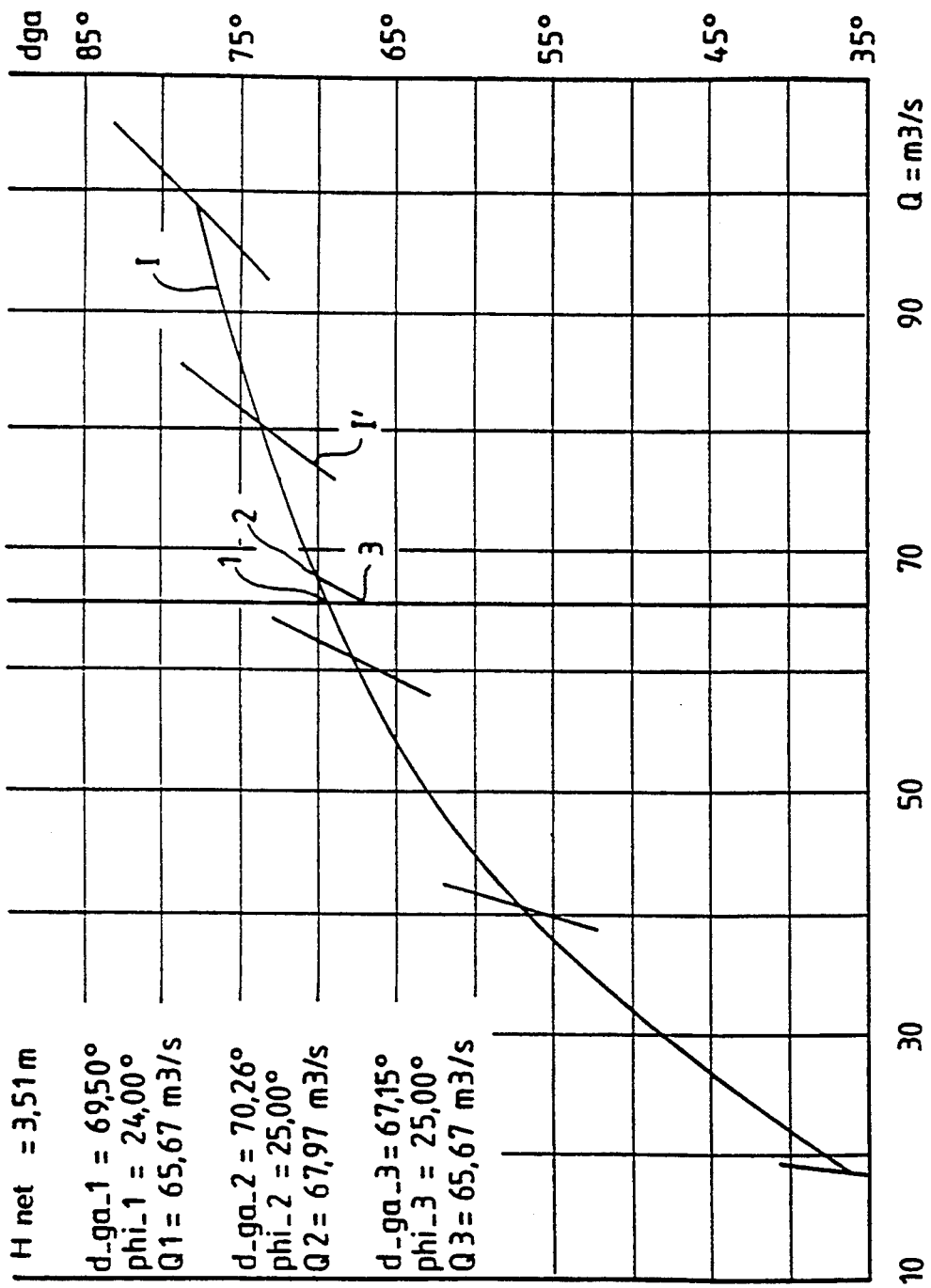
FIG. 3 shows curve I and a number of curves I', as shown in FIG. 1, wherein the fashion in which the gate opening $\Delta\gamma$ and the runner opening $\phi$ are jointly varied in such a way that the change remains flow-neutral is illustrated.

FIG. 3 also shows curve I intersected by a number of curves I' (refer to FIG. 1). This illustrates the fashion in which the gate opening $\Delta\gamma$ and the runner opening $\phi$ are jointly varied in such a way that the change remains flow-neutral.

Three points are recognizable in the diagram, namely (1), (2) and (3) which are referred to in the table in the diagram. Point (1) represents the starting situation where a specific runner opening $\phi$ and a specific flow Q are coordinated with a specific gate opening $\Delta\gamma$. Next, the second point is found on the model optimum curve I by variation of the runner opening $\phi$. The second point has coordinated with it a second gate opening $\Delta\gamma$, a second runner opening $\phi$, and a second flow. Lastly, a departure is made from the model optimum curve I, and the third point is determined while the second runner opening $\phi$ is retained and the second gate opening $\Delta\gamma$ is changed. This third point has the same flow as the first point.

Figure 4:
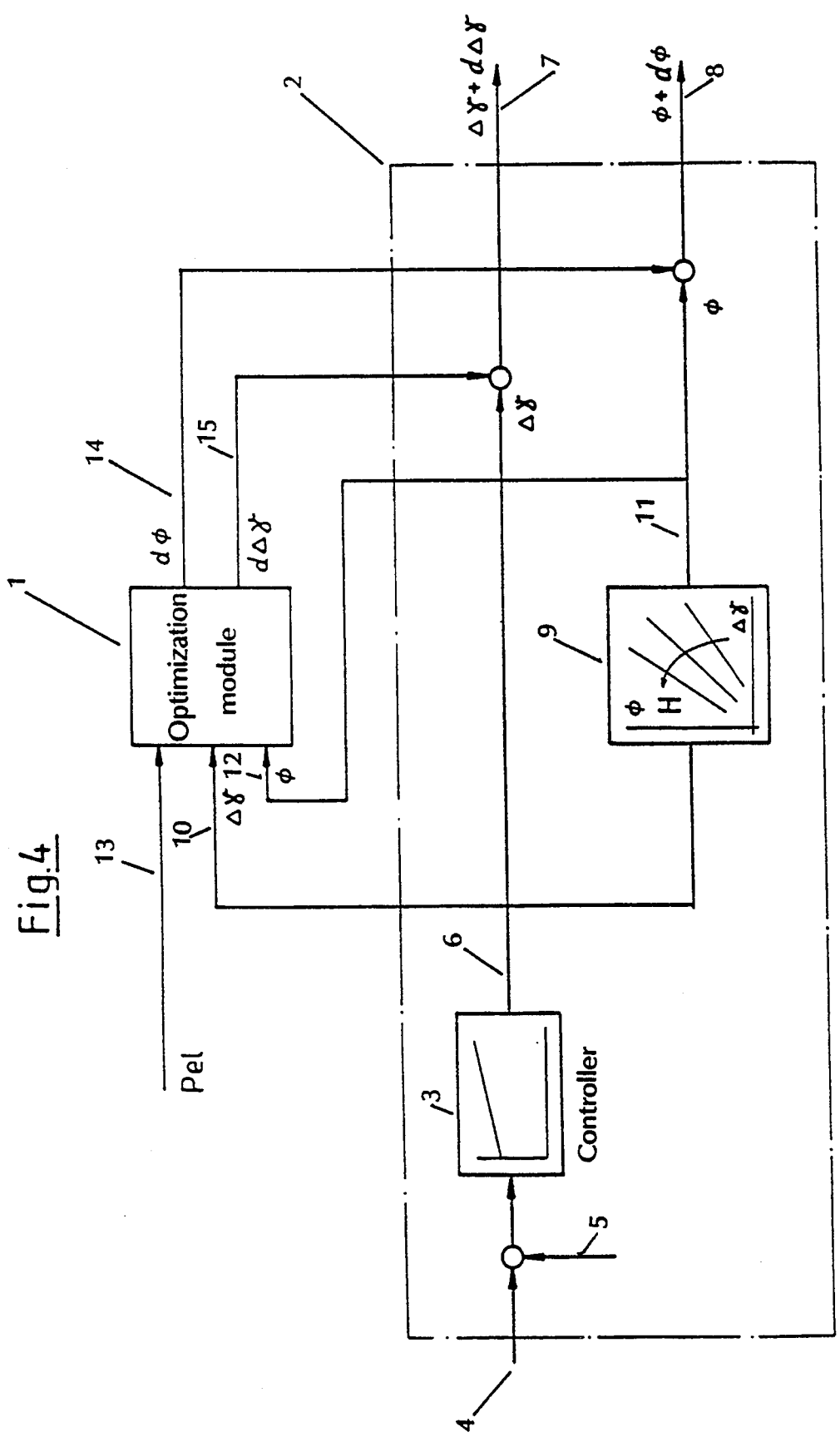
FIG. 4 shows a block diagram of the inventional module.

FIG. 4 shows a block diagram of the inventional module. The optimization module is visible, which superimposes the respective changes of the values of the gate opening $\Delta\gamma$ and of the runner opening $\phi$, namely $d\Delta\gamma$ and $d\phi$, upon the values coming from the controller.

More particularly, FIG. 4 shows a block diagram of the inventional optimizing module 1 in conjunction with a control system 2 as usual in a power plant, represented by the dash-dot box. Fed to a controller 3 in such control system, normally, are setpoints 4 and actual values 5 (normally heights of drop H) which lead to a set gate opening $\Delta\gamma$ 6. For one, this gate opening $\Delta\gamma$ is now fed to the turbine itself via output 7 and to a mapping-processing module 9. Module 9 determines by way of a preestablished mapping the best runner opening $\phi$ and feeds it via output 8 as well to the turbine. So far, the description matches the prior art.

Inventionally, optimizing module 1 is superimposed on this scheme as follows: the setpoint prevailing on line 6, for the gate opening $\Delta\gamma$ is additionally fed to input 10 on optimizing module 1. Also, the runner opening setpoint $\phi$ is transmitted from output 11 of module 9 to input 12 of optimizing module 1. Furthermore, the measured electrical output Pel of the generator is via input 13 passed to the optimizing module 1. In keeping with the inventional idea, correction values for the gate opening $\Delta\gamma$ and runner opening $\phi$ are now determined by the optimizing module 1 and emitted to outputs 15 and 14 and applied to the setpoints of gate opening $\Delta\gamma$ 6 and runner opening $\phi$ 11, to be available as corrected setpoints of the gate opening $\Delta\gamma + d\Delta\gamma$ on output 7, and of the runner opening $\phi + d\phi$ on output 8 for the turbine.

Figure 5:
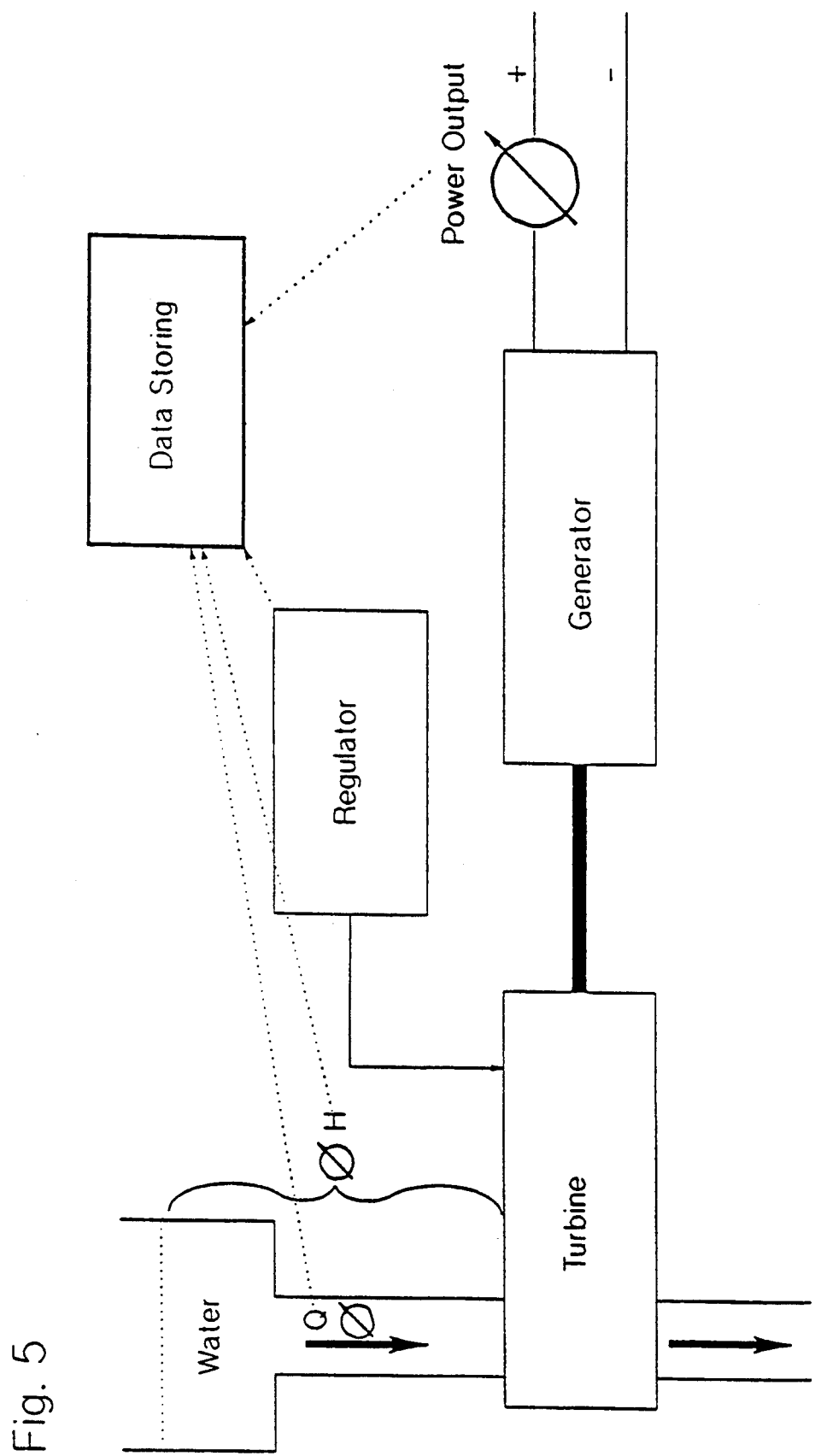
FIG. 5 shows the situation of a model machine set comprised of a turbine and generator

FIG. 5 shows the situation of the model machine set comprised of turbine and generator. The turbine is powered by the water flow Q fed to the turbine by way of height of drop H. In turn, the turbine drives the generator, which generates a current which is measured at the output of the generator. The turbine is controlled by a control system which adjusts the angular positions $\Delta\gamma$ and $\phi$. In the model system, notably the water flow Q is measured and transmitted to a data storage system, along with the height of drop H, $\Delta\gamma$ and $\phi$ and the value of the generated current.

Figure 6:
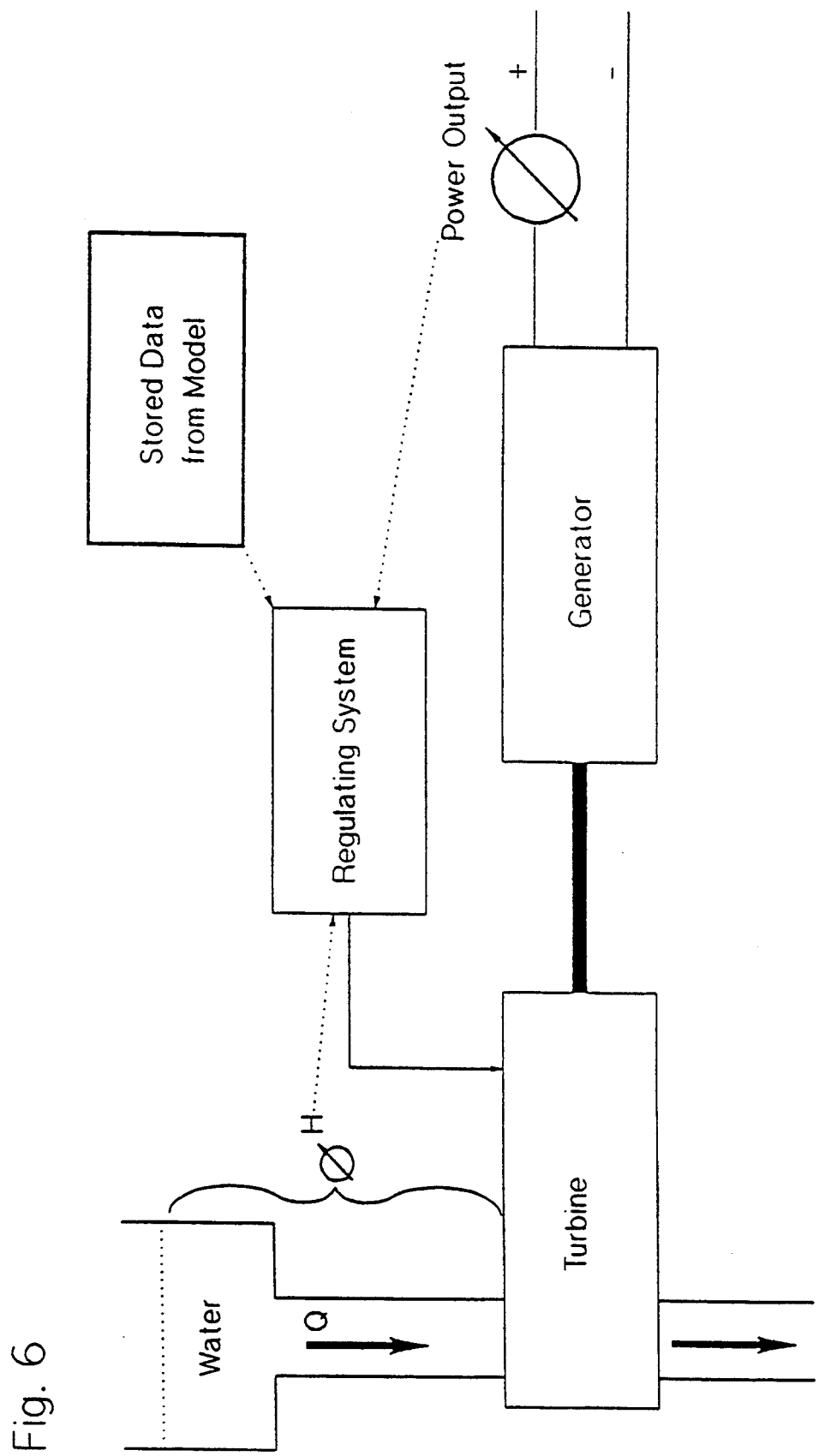
FIG. 6 shows a large-scale machine set with a turbine and generator.

FIG. 6 shows the corresponding situation for the large-scale machine set, again with the turbine and generator which delivers an output current. Measured in this system are merely the height of drop H and the output current of the generator. The adjustment $\Delta\gamma$ and $\phi$ is inventionally made via a control system in contingence on the known data determined by the model test.

What is claimed is:

1. A method for optimizing the efficiency of a set of machines comprising a double-controlled turbine and a generator comprising the steps of:
   (a) determining a correlation between an efficiency $\eta$, flow Q, variable height of fall H, gate opening $\Delta\gamma$ and runner opening $\phi$ on a model set of machines by test series, said determination yielding a model optimum curve for the respective height of fall, the model optimum curve having the optimum gate opening as a function of flow and runner opening; and
   (b) determining an optimum efficiency for an operating point of a large-scale system, the optimum efficiency determination process comprising;
      (1) based on the model optimum curve, making variations of the gate opening $\Delta\gamma$ and of the runner opening $\phi$ on the large-scale system, the variations being such that the flow of the model set of machines would remain constant for the same variations, and wherein $\phi$ flow of the large-scale system is also presumed to be constant;
      (2) comparing a power output before and a power output after the variations to determine stepwise a $\Delta\gamma/\phi$ operating point with optimum efficiency.

2. The process of claim 1, wherein an actual optimum correlation valid for the large-scale system is determined by repeating process steps (b) (1) and (b) (2) for various heights of fall and flows.

3. The process of claim 2, in which previously optimized operating points are marked, and wherein the set of machines, when at the same heights of fall and without previous optimization, is set directly to optimized settings.

4. The process of claim 2, wherein the optimum efficiency determination process comprises the steps of;
   (a) selecting on the model optimum curve a first point
      (1) with which a first gate opening $\Delta\gamma$, a first runner opening $\phi$, and a first flow are coordinated;
   (b) by way of computation, choosing a second point
      (2) on the model optimum curve by variation of the runner opening $\phi$, the second point including a second runner opening $\phi$, a second gate opening $\Delta\gamma$, and a second flow;
   (c) again by way of computation, determining a third point (3) by departure from the model optimum curve, the third point determination occurring by retaining the second runner opening $\phi$ and changing the gate opening $\Delta\gamma$ until the first flow, according to the measured values of the model set of machines, is reached again;
   (d) setting the runner opening $\phi$ and gate opening $\Delta\gamma$ thus determined by direct tuning of the large-scale system.

5. The process of claim 4, in which previously optimized operating points are marked, and wherein the set of machines, when at the same heights of fall and without previous optimization, is set directly to optimized settings.

6. The process of claim 1, wherein the optimum efficiency determination process comprises the steps of;
   (a) selecting on the model optimum curve a first point
      (1) with which a first gate opening $\Delta\gamma$, a first runner opening $\phi$, and a first flow are coordinated;
   (b) by way of computation, choosing a second point
      (2) on the model optimum curve by variation of the runner opening $\phi$, the second point including a second runner opening $\phi$, a second gate opening $\Delta\gamma$, and a second flow;
   (c) again by way of computation, determining a third point (3) by departure from the model optimum curve, the third point determination occurring by retaining the second runner opening $\phi$ and changing the gate opening $\Delta\gamma$ until the first flow, according to the measured values of the model set of machines, is reached again;
   (d) setting the runner opening $\phi$ and gate opening $\Delta\gamma$ thus determined by direct tuning of the large-scale system.

7. The process of claim 6, in which previously optimized operating points are marked, and wherein the set of machines, when at the same heights of fall and without previous optimization, is set directly to optimized settings.

8. The process of claim 1, in which previously optimized operating points are marked, and wherein the set of machines, when at the same heights of fall and without previous optimization, is set directly to optimized settings.

9. A method for optimizing the efficiency of a set of machines comprising a double-controlled turbine and a generator comprising the steps of:

(a) determining a correlation between an efficiency $\eta$, flow Q, variable height of fall H, gate opening $\Delta\gamma$ and runner opening $\phi$ on a model set of machines by measuring of said efficiency $\eta$ in dependence of said variables Q, H, $\Delta\gamma$ and $\phi$, said determination yielding a model optimum curve for the respective height of fall, the model optimum curve having the optimum gate opening as a function of flow and runner opening;

(b) storing said model optimum curve in a means for data-storing;

(c) transferring said model optimum curve data to a regulating system of a large-scale system; and (d) determining an optimum efficiency for an operating point of the large-scale system, the optimum efficiency determination process comprising;

(1) based on the model optimum curve, making variations of the gate opening $\Delta\gamma$ and of the runner opening $\phi$ on the large-scale system, the variations being such that the flow of the model set of machines would remain constant for the same variations, and wherein a flow of the large-scale system is also presumed to be constant;

(2) adjusting the gate opening $\Delta\gamma$ and the runner opening $\phi$ according to a position which is found more efficient;

(3) comparing a power output before and a power output after the variations to determine stepwise a $\Delta\gamma/\phi$ operating point with optimum efficiency.

* * * * *

UNITED STATES PATENT AND TRADEMARK OFFICE
CERTIFICATE OF CORRECTION

PATENT NO. : 5,402,332
DATED : March 28, 1995
INVENTOR(S) : Eberhard Kopf

It is certified that error appears in the above-indentified patent and that said Letters Patent is hereby corrected as shown below:

Title page: In the Abstract, line 4, after the word efficiency, delete "ß", and insert -- η --.

Claim 1, column 6, line 6, after the word wherein, delete "φ", and insert -- a --.

Signed and Sealed this

Thirteenth Day of June, 1995

Attest:

BRUCE LEHMAN

Attesting Officer

Commissioner of Patents and Trademarks